(12) United States Patent
Nishimura et al.

(10) Patent No.: US 11,267,209 B2
(45) Date of Patent: Mar. 8, 2022

(54) PFA MOLDED BODY WITH EXCELLENT BLISTER RESISTANCE AND METHOD OF CONTROLLING OCCURRENCE OF BLISTERS IN PFA MOLDED BODY

(71) Applicant: DUPONT-MITSUI FLUOROCHEMICALS CO., LTD., Tokyo (JP)

(72) Inventors: Takahiro Nishimura, Shizuoka (JP); Hitomi Nishimura, Shizuoka (JP); Chorong Jeong, Shizuoka (JP)

(73) Assignee: CHEMOURS-MITSUI FLUOROPRODUCTS CO., LTD., Minato-ku (JP)

( * ) Notice: Subject to any disclaimer, the term of this patent is extended or adjusted under 35 U.S.C. 154(b) by 330 days.

(21) Appl. No.: 15/539,568

(22) PCT Filed: Dec. 18, 2015

(86) PCT No.: PCT/US2015/066674
§ 371 (c)(1),
(2) Date: Jun. 23, 2017

(87) PCT Pub. No.: WO2016/106125
PCT Pub. Date: Jun. 30, 2016

(65) Prior Publication Data
US 2017/0361548 A1    Dec. 21, 2017

(30) Foreign Application Priority Data
Dec. 26, 2014  (JP) .............................. JP2014-264978

(51) Int. Cl.
B29C 71/02    (2006.01)
B29K 27/12    (2006.01)
C08F 214/26   (2006.01)

(52) U.S. Cl.
CPC ........ *B29C 71/02* (2013.01); *B29C 2071/022* (2013.01); *B29K 2027/12* (2013.01); *C08F 214/262* (2013.01)

(58) Field of Classification Search
None
See application file for complete search history.

(56) References Cited

U.S. PATENT DOCUMENTS

2003/0102593 A1* 6/2003 Kaulbach ............... C08L 27/18
                                                  264/211
2005/0048240 A1    3/2005 Hayashi et al.
(Continued)

FOREIGN PATENT DOCUMENTS

EP    1 510 326 A1    3/2005
JP    2007-196641 A   8/2007
(Continued)

OTHER PUBLICATIONS

PCT International Search Report and Written Opinion dated Mar. 7, 2017.
(Continued)

*Primary Examiner* — Francisco W Tschen

(57) ABSTRACT

Provided is a molded body with a hollow portion comprising tetrafluoroethylene and perfluoro(alkyl vinyl ether) copolymer, which is obtained by heat treating a molded body with a hollow portion obtained by melt molding tetrafluoroethylene and perfluoro(alkyl vinyl ether) copolymer having a melt flow rate of 0.1 to 100 g/10 min when measured with a load of 5 kg and a measurement temperature of 372±0.1° C. in accordance with ASTM D1238. The heat treatment is carried out at a temperature from 130° C. below the melting point of the copolymer to the melting point of the copolymer. The molded body exhibits excellent blister resistance when utilized in contact with harsh chemicals and under harsh operating conditions.

7 Claims, 6 Drawing Sheets

(A)
300°C Annealing (B)
260°C Annealing (C)
No Annealing

(56) References Cited

U.S. PATENT DOCUMENTS

| | | | | |
|---|---|---|---|---|
| 2005/0107535 A1* | 5/2005 | Funaki | ................. | C08F 214/18 |
| | | | | 525/191 |
| 2007/0178267 A1* | 8/2007 | Hama | ................. | B29C 49/0005 |
| | | | | 428/35.7 |
| 2012/0034406 A1* | 2/2012 | Lahijani | .............. | B29C 71/0063 |
| | | | | 428/36.9 |
| 2015/0315317 A1* | 11/2015 | Colaianna | ........... | C08F 214/265 |
| | | | | 264/345 |
| 2017/0107305 A1* | 4/2017 | Colaianna | ........... | C08F 214/262 |

FOREIGN PATENT DOCUMENTS

| | | |
|---|---|---|
| WO | 2012/019066 A1 | 2/2012 |
| WO | 2012/019070 A1 | 2/2012 |
| WO | 2013/081920 A1 | 6/2013 |
| WO | 2014/086694 A1 | 6/2014 |

OTHER PUBLICATIONS

Fluororesin Handbook, published by Nikkan Kogyo Shimbun Inc., publisher Toshio Fujiyoshi, 1990, pp. 107 & 108.

Fluororesin, DuPont TM Teflon (registered trademark) Practical Handbook, published by DuPont-Mitsui Fluorochemical Co., Ltd., 1989, pp. 32 and 55.

* cited by examiner (A) 300°C Annealing  (B) 260°C Annealing  (C) No Annealing

PFA MOLDED BODY WITH EXCELLENT BLISTER RESISTANCE AND METHOD OF CONTROLLING OCCURRENCE OF BLISTERS IN PFA MOLDED BODY

CROSS-REFERENCES TO RELATED APPLICATIONS

This application claims the benefit of Japanese Patent Application No. 2014-264978 filed Dec. 26, 2014, which is incorporated by reference herein in its entirety.

FIELD OF THE INVENTION

The present invention relates to a tetrafluoroethylene and perfluoro(alkyl vinyl ether) copolymer molded body with a hollow portion, the molded body having excellent blister resistance.

Furthermore, the present invention relates to a method for inhibiting the occurrence of blisters in a tetrafluoroethylene and perfluoro(alkyl vinyl ether) copolymer molded body with a hollow portion.

BACKGROUND TECHNOLOGY

Fluorine resins have excellent chemical properties, electrical properties, mechanical properties and surface properties and are used in a wide range of applications. Among these fluorine resins, copolymers of tetrafluoroethylene (TFE) and perfluoro(alkyl vinyl ether) (PAVE) (such copolymers also commonly referred to as PFA in this field) demonstrate the desirable properties of a fluorine resin, but also have excellent heat resistance, chemical resistance, purity (can be manufactured chemically inert without containing additives), and stress crack resistance. Furthermore, because they have melt fluidity (i.e., are flowable when molten), they also have a property where thermal melt molding is possible. Therefore, they are used for manufacturing semiconductors and liquid crystals, or as molding materials for pipes that transport a variety of chemicals used in chemical plants, and the like. They are also used as molding materials for pipe joints, storage containers, pumps and filter housings, tubes and fittings. In particular, PFA pipes are commonly used in the transport of liquid chemicals.

PFA molded bodies demonstrate excellent chemical resistance. However, because they are utilized in manufacturing semiconductors or liquid crystals, and in chemical plants and the like under extremely severe chemical, thermal, and physical environments as well as compound environments thereof, they are subjected to physical damage due to chemical attack, sudden temperature and pressure changes, impregnation and permeation of chemical liquids and gases, and interactions thereof. Consequently, it is known that blisters, which are swelling or bubble-like structures, and microcracks are known to occur in the molded body. When blisters occur in a molded body such as a tube or the like, the outer surface develops bumps, and there is a possibility that long-term use will be impaired.

In chemical liquid supply pipes made of PFA, it is known that a small amount of chemical liquid will permeate through the walls of the pipe, and methods to reduce the amount of chemical liquid permeation have been proposed. For example, reducing the amount of permeation of nitric acid by using a terpolymer, where PFA has been modified by a long chain perfluoro vinyl ether, has been proposed in Japanese Unexamined Patent Application 2001-151852 (Patent Document 1). However, the occurrence of blisters cannot be controlled even when this method is used. Furthermore, a method of coating a PFA tube with a resin having a lower permeability has been proposed in Japanese Unexamined Patent Application 2007-292292. With this method, the degree of adhesion at the interface between the PFA and the coating resin is weak, and the occurrence of blisters at the interface has been reported.

PRIOR TECHNOLOGY DOCUMENTS

Patent Documents

Patent document 1: Japanese Unexamined Patent Application 2001-151852
Patent document 2: Japanese Unexamined Patent Application 2007-292292
Patent document 3: Japanese Unexamined Patent Application 2007-196641
Patent document 4: Japanese Unexamined Patent Application 2005-67079

Non-Patent Documents

Non-Patent document 1: Handbook of Fluorine Resins, page 108, published by Nikkan Kogyo Publishing
Non-Patent document 2: Fluorine Resins, Handbook of applications for DuPont™ Teflon (registered trademark), published by Mitsu DuPont Fluorochemical Co., Ltd.

SUMMARY OF THE INVENTION

Problem to be Resolved by the Invention

The present inventors achieved the present invention as a result of extensive effort to develop a technique for achieving a molded body from copolymer of tetrafluoroethylene (TFE) and perfluoro(alkyl vinyl ether) (PAVE) (such copolymers also commonly referred to as PFA in this field) that has excellent blister resistance. The present invention provides a PFA molded body with a hollow portion, wherein the PFA molded body has excellent blister resistance.

The present invention provides a method of manufacturing a PFA molded body with a hollow portion, wherein the PFA molded body has excellent blister resistance.

The present invention also provides a PFA molded body with a hollow portion, wherein the PFA molded body has a reduced amount of blistering.

Means for Resolving the Problem

The present invention provides a molded body with a hollow portion made of a copolymer (PFA) of tetrafluoroethylene (TFE) and perfluoro(alkyl vinyl ether) (PAVE) representing a molded body with a hollow portion, which is obtained by heat treating a molded body with a hollow portion obtained by melt molding PFA containing 3 to 50 weight % of PAVE and having a melt flow rate (MFR) of 0.1 to 100 g/10 min when measured with a load of 5 kg and a measurement temperature of 372±0.1° C. in accordance with ASTM D1238, at a temperature from 130° C. below copolymer the melting point to the copolymer melting point, and having a blister presence rate as calculated by the following equation [I] of 50% or less:

Blister presence rate=number of blisters in a heat treated molded body/number of blisters in an equivalent molded body that has not been heat treated [I]

A preferred embodiment of the present invention is a PFA molded body with a hollow portion where the heat treatment is performed at a temperature from a temperature 80° C. below the copolymer melting point to the copolymer melting point.

A preferable embodiment of the present invention is a PFA molded body with a hollow portion where the heat treatment is performed at a temperature from a temperature 60° C. below the copolymer melting point to the copolymer melting point.

A preferable embodiment of the PFA molded body with a hollow portion of the present invention is a pipe for transporting various types of chemical liquids that are used for manufacturing semiconductors and liquid crystals, as well as pipe joints, storage containers, pumps, and filter housings.

A more preferable embodiment of the PFA molded body with a hollow portion of the present invention is tubes and fittings made of PFA with a hollow portion that are used in the manufacture of semiconductors and liquid crystals.

The present invention also provides a method of controlling blisters in a PFA molded body with a hollow portion, comprising a step for heat treating a molded body with a hollow portion obtained by melt molding PFA, which is a copolymer of tetrafluoroethylene (TFE) and perfluoro(alkyl vinyl ether) (PAVE), containing 3 to 50 weight % of PAVE in the copolymer and having a melt flow rate (MFR) of 0.1 to 100 g/10 min when measured at a load of 5 kg and a measurement temperature of 372±0.1° C. in accordance with ASTM D1238, said heat treating being carried out at a temperature of from 130° C. below the PFA melting point to the PFA melting point.

Effect of the Invention

The present invention has an unexpected and excellent result of inhibiting the occurrence of blisters that occur during the use of PFA molded bodies, by heat treating the PFA molded body with a hollow portion obtained by melt molding melt processable PFA. That is to say, the present invention provides a PFA molded body with a hollow portion that has excellent blister resistance.

Furthermore, the present invention provides a method for inhibiting the occurrence of blisters in a PFA molded body with a hollow portion.

Moreover, the present invention provides a PFA molded body with a hollow portion that has a lower occurrence of blisters.

Molded bodies obtained by injection molding or extrusion molding of resin materials other than fluorine resins that have a melt fluidity experience molding strain due to external forces such as stress during molding, and differences in the degree of crystallization depending on the volume inside the molded body during the cooling and solidifying process. The strain inside the molded body is relieved over time and with heating, but if the relief proceeds rapidly, a phenomenon where the molded body deforms and the like will occur, and therefore immediately after the molding process or after molding, the molded body is annealed by heating to a temperature at approximately 20° C. plus the temperature of use for the application of that resin material, or in other words, close to ambient temperature (room temperature).

Furthermore, the molding process of polytetrafluoroethylene (PTFE), which is a fluorine resin that does not have a melt fluidity, is performed by a method of preliminarily molding a substrate for processing from PTFE resin powder (so-called molding powder), and then performing a mechanical operation such as machining or the like. Industrially, a molding method such as a freezing method, hot coining method, free baking method, hot molding method, and isostatic molding method, and the like, can be used. A PTFE molded body obtained by these molding methods will also have similar strain, so the internal strain is relieved by heating during the mechanical process, and therefore the dimensional precision is inferior. Therefore, similarly with PTFE, an annealing process is known where the PTFE molded body is heated to a temperature slightly higher than the temperature of use (120° C. to 250° C.) in order to prevent deformation due to the strain relief phenomenon (Non-Patent Document 1, page 32, and Non-Patent Document 2).

In addition, with a molded body obtained by injection molding PFA with a melt fluidity, there is an internal residual strain created during molding. There is a possibility for shape precision (dimensional precision) defects due to the internal residual strain, so an annealing fixture is attached to parts that require shape precision (dimensional precision) of the molded body, and the annealing process is then performed by heating at a temperature below the temperature of use (patent document 3). Furthermore, extruded tubes are known where a thermoplastic fluorine resin having melt fluidity, such as PFA or a tetrafluoroethylene/hexafluoro propylene copolymer (FEP), is formed to make a tubular member by extrusion molding or the like, and then stretched at a temperature below the molding temperature. Then, after stretching, it is annealed at a temperature below the stretching temperature in order to perform thermal fixing (Patent Document 4). Patent Document 4 discloses that an extrusion molded tube is stretched to 5 to 6 times, and then the stretched tube is annealed at 220 to 230° C. A stretched tube obtained in this manner will be in a condition where the majority of the PFA and FEP molecules are oriented, and are in a condition that is different from a standard molded body (including a case where only a portion of the molecules are oriented). In addition, these patent documents make no mention about blisters that occur in PFA molded bodies with a hollow portion, and make no mention of inhibiting the occurrence of those blisters.

When a PFA molded body is heat aged for a long period of time (60,000 to 120,000 min), decomposition of the PFA is known to occur (Non-Patent Document 2, page 55). However, heat treating at the specific conditions for the PFA molded body with a hollow portion of the present invention is different than heat aging for a long period of time. Therefore, an unanticipated and excellent effect is achieved in the present invention, in which the occurrence of blisters is inhibited while not causing decomposition of the PFA, and while maintaining the dimensional precision of the molded body.

Figure 4:
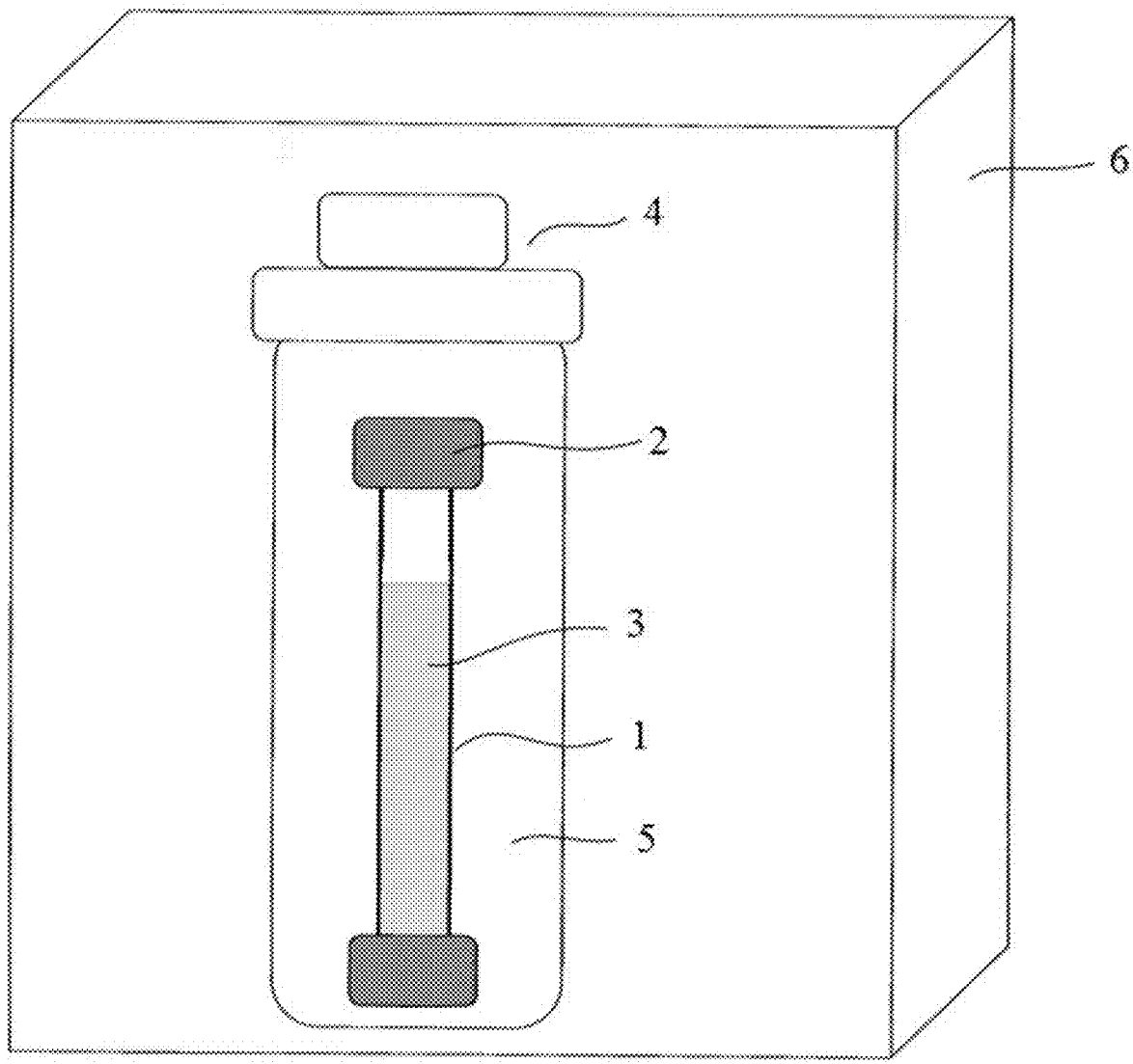
FIG. 4 is a schematic diagram illustrating a device that is used for testing the occurrence of blisters for the present invention.
Figure 5:
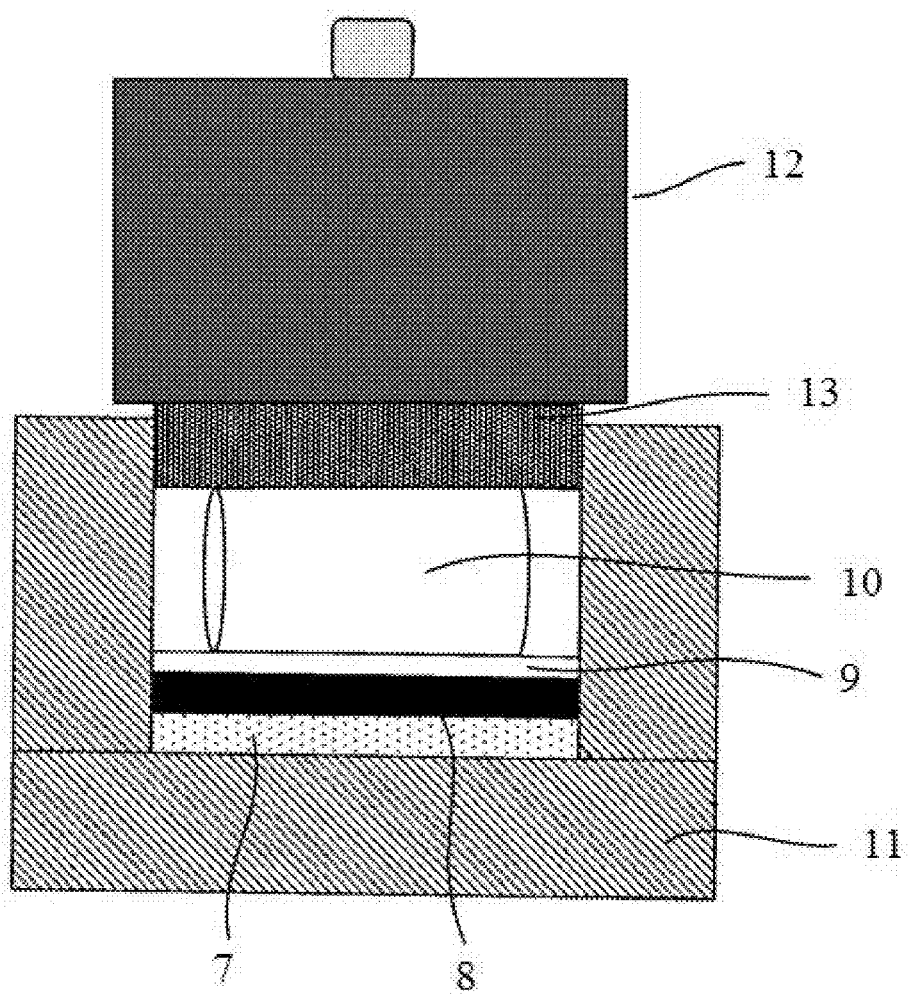
FIG. 5 is a schematic diagram illustrating a device that is used for transcribing the surface of the molded body by the measuring of the number of blisters that have occurred with the present invention.

Numbering in FIGS. 4 and 5 corresponds to:
1 Heat treated PFA tube
2 Sealing stopper
3 35 mass % hydrochloric acid solution
4 Glass bottle
5 Pure water
6 Oven
7 PFA plate
8 Carbon transcription paper
9 Copy paper
10 PFA tube for measuring blisters
11 Guide part
12 Weight
13 PTFE plate

DESCRIPTION OF THE PREFERRED EMBODIMENTS

The PFA of the present invention is a melt moldable copolymer obtained by copolymerizing tetrafluoroethylene (TFE), which is a main component, with perfluoro(alkyl vinyl ether) (PAVE) as a co-monomer.

In the PFA of the present invention, the perfluoro(alkyl vinyl ether) (PAVE) that is used as the comonomer is also referred to as perfluoroalkoxy trifluoroethylene, and can be expressed by the following formulas (1) or (2).

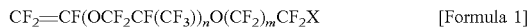

$$CF_2=CF(OCF_2CF(CF_3))_nO(CF_2)_mCF_2X \quad \text{[Formula 1]}$$

(wherein, in the Formula 1, X represents H or F, n is an integer of 0 to 4, and m is an integer of 0 to 7)

$$CF_2=CF(OCF_2CF(CF_3))_qOCF_2CF(CF_3)CF_3 \quad \text{[Formula 2]}$$

(wherein, in the Formula 2, q is an integer of 0 to 3)

The PAVE that is used in the present invention is preferably perfluoro(methyl vinyl ether) (PMVE), perfluoro(ethyl vinyl ether) (PEVE), perfluoro(propyl vinyl ether) (PPVE) or perfluoro(butyl vinyl ether) (PBVE). Among these, perfluoro(ethyl vinyl ether) (PEVE) and perfluoro(propyl vinyl ether) (PPVE) are most preferred.

In the present invention, the amount of PAVE is 2 to 50 weight %, preferably 2 to 20 weight %, and more preferably 2 to 10 weight %. If the amount of PAVE is too low, there is a possibility that problems will occur, such as the durability of the resin being inferior, and melt molding will be difficult. Furthermore, if the amount of PAVE is too high, there is a possibility that problems will occur, such as the permeability of the PFA towards gas and chemical liquids being too high, and the mechanical strength being inferior.

The PFA of the present invention can also include additional co-monomers that can copolymerized with TFE. The amount of such additional comonomer is preferably less than the amount of PAVE. Examples of the additional comonomer that can be copolymerized with TFE include comonomers containing fluorine, such as perfluoroalkanes with 3 to 6 carbon atoms, PAVE with 1 to 6 carbon atoms, chlorotrifluoroethylene, vinylidene fluoride, vinyl fluoride, and the like, and comonomers not containing fluorine, such as ethylene, propylene, and the like.

The melt flow rate (MFR) of the PFA of the present invention is preferably 0.1 to 100 g/10 min, more preferably 0.1 to 70 g/10 min, as measured with a load of 5 kg and at a measurement temperature of 372±0.1° C. in accordance with ASTM D 1238.

The PFA of the present invention can be obtained by solution polymerization, emulsion polymerization, or suspension polymerization. For example, the PFA can be obtained by the polymerization method (aqueous dispersion polymerization=emulsion polymerization) disclosed in Japanese Patent Publication No. 3980649. After polymerization is complete, the aqueous dispersion that is obtained can be used by adjusting the amount of solid fraction and the emulsion stabilizer, and the like, as necessary.

Furthermore, the solid PFA can be collected from the aqueous polymerization solvent of the aqueous dispersion obtained using a commonly known conventional technique (for example, U.S. Pat. No. 5,266,639). For example, solid PFA can be obtained by adding an electrolytic substance to the aqueous dispersion, causing the colloidal particles of the fluorine resin to aggregate under mechanical agitation, separating the aqueous solvent, and then water washing and drying as necessary. The solid PFA can be molded and used in the form of a pellet.

For semiconductor applications, PFA that has been preliminarily fluorinated is preferably used in order to eliminate polluting substances from the fluorine resin. The method of fluorinating the PFA can be a conventionally known method. Examples of fluorination methods are disclosed in Japanese Examined Patent Application No. H4-83, Japanese Examined Patent Application No. H7-30134, and Japanese Unexamined Patent Application No. H4-20507.

The PFA of the present invention may include PTFE and/or PFA with a different type or amount of PAVE. Examples of the PTFE include a homopolymer of tetrafluoroethylene, or modified PTFE containing a trace amount of 1 weight % or less of a comonomer such as hexafluoropropylene, perfluoro(alkyl vinyl ether), perfluoroalkylethylene, chlorotrifluoroethylene, and the like.

The PFA molded body with a hollow portion according to the present invention has a shape with a hollow portion in a molded body, and specific examples include a tube shaped molded body (tubing), a molded body with a desired hollow portion, such as a pipe for transporting various types of chemical liquids that are used in semiconductor and liquid crystal manufacturing processes, as well as joints (fittings) for pipes, storage containers, pumps, filter housings, and the like. These molded bodies can be obtained by an injection molding method, extrusion molding method, blow molding method, transfer molding method, and the like. A molded body with this type of hollow portion can be a device for supplying various types of acidic or alkaline chemical liquids that are used in semiconductor or liquid crystal manufacturing processes, as well as various types of chemical reactors, semiconductor manufacturing devices, and the like.

A molded body obtained by an extrusion molding method, blow molding method, or transfer molding method is preferable as the PFA molded body with a hollow portion according to the present invention.

Of these, a tube molded body is preferable as the molded body with a hollow portion, but a tube molded body obtained by an extrusion molding method is more preferable. Furthermore, an unstretched tube molded body obtained by an extrusion molding method is particularly preferable.

The material thickness of the molded body with a hollow portion according to the present invention is 0.1 to 10 mm, preferably 0.1 to 5 mm, and more preferably 0.1 to 3 mm.

The heat treatment of the PFA molded body with a hollow portion according to the present invention is performed by placing the molded body in an appropriate heated environment. The heated environment can be achieved by a method of placing in an oven, a method of inserting a heater inside the PFA mold with a hollow portion, a method of covering the outer circumference of the PFA mold with a hollow portion with a heater, and the like.

The heat treatment temperature of the PFA hollow molded body of the present invention is preferably a temperature that is higher than the temperature of use of the PFA molded body. Examples of preferable heat treatment temperatures include a temperature from a temperature 130° C. below the melting point of the PFA to the melting point of the PFA, more preferably from a temperature 80° C. below the melting point to the melting point, even more preferably from a temperature 60° C. below the melting point to the melting point, and particularly preferably from a temperature of 40° C. below the melting point to the melting point. By performing this type of heat treatment, the internal residual strain of the PFA molded body is relieved, the dimensional precision of the PFA molded body is maintained, and consequently the occurrence of blisters is inhibited.

For example, for the case of PFA with a melting point of 320° C., a preferable heat treatment temperature is 190 to 320° C., more preferably 240 to 320° C., even more preferably 260 to 320° C., and particularly preferably 280 to 320° C.

The heat treatment time for the molded body of the present invention is preferably 0.1 min to 10,000 min (approximately 1 week) per 1 mm of thickness of the molded body. The time is more preferably 0.1 min to 1500 min (approximately 24 hours) per 1 mm of thickness, and more preferably 0.1 to 300 min per 1 mm of thickness.

During heat treatment of the molded body of the present invention, the temperature rise rate when heating the molded body and the temperature drop rate after heating are not particularly restricted. The molded body can be inserted in an oven that has been heated to a predetermined heat treatment temperature in order to perform rapid heating, or the molded body can be gradually heated to the heat treatment temperature in an oven. The temperature rise rate of the molded body is 300° C./min to 1° C./min, preferably 250° C./min to 3° C./min, and more preferably 200° C./min to 5° C./min. The temperature drop rate can also be either sudden cooling, or gradual cooling. For example, cooling can be achieved by removing from the oven after heat treatment and allowing to cool to room temperature, or by leaving in the oven and cooling. The temperature drop rate of the molded body is 300° C./min to 1° C./min, preferably 250° C./min to 1° C./min, and more preferably 200° C./min to 1° C./min.

The dimensions of the heat treated PFA molded body with a hollow portion are preferably determined by considering beforehand a shrinkage of the molded body due to the heat treatment, depending on the shape of the molded body.

The present inventor has hypothesized that the occurrence of blisters in the PFA molded body with a hollow portion is caused by the chemical liquid in the hollow portion of the molded body penetrating into the molded body such as a tube or the like. However, by heat treating at the specific conditions of the present invention, an unexpected result was obtained in that the occurrence of blisters was inhibited while the dimensional precision was maintained, making it possible to utilize the molded body over a longer period of time.

Figure 1:
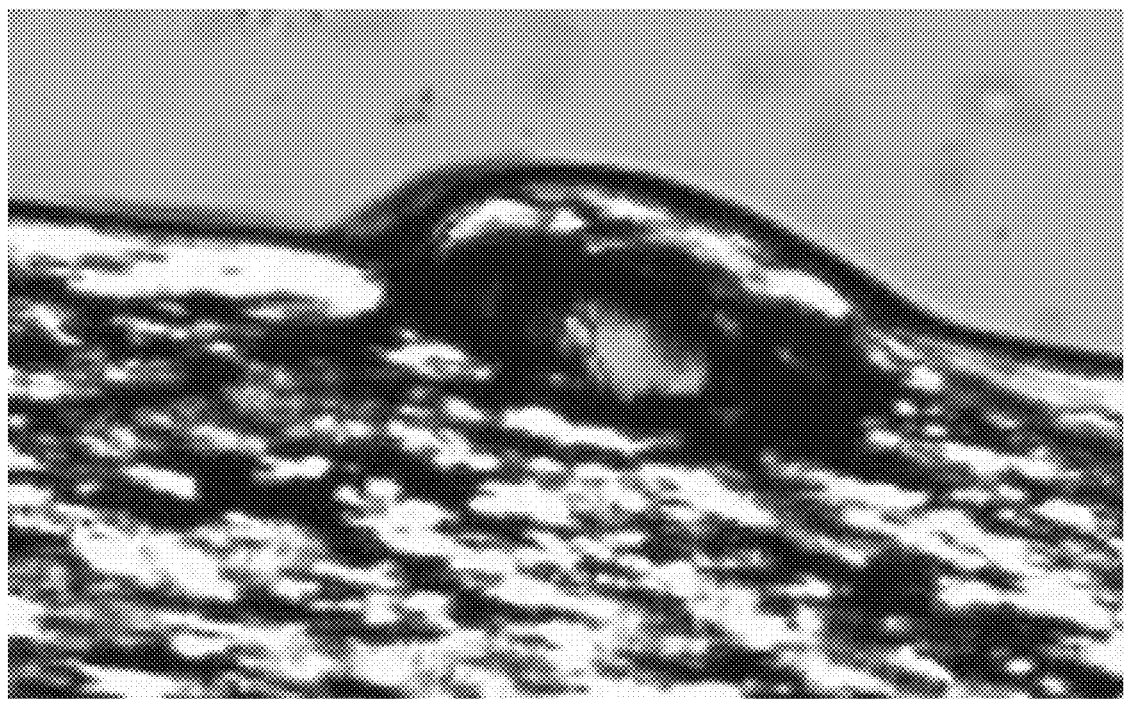
FIG. 1 is a cross-sectional view at 50× magnification by polarization-microscope of a blister that occurs in a PFA molded body.

FIG. 1 is a cross-sectional view at 50× magnification by polarization-microscope of a blister that occurs in a PFA molded body.

The PFA molded body with a hollow portion that was heat treated according to the present invention is more preferably used in dry air, in a nitrogen gas environment, or in an inert gas, or the like.

The occurrence of blisters in the PFA molded body with a hollow portion can be inhibited by the present invention, and thus the useful life of the molded body can be greatly extended.

Furthermore, the present invention can provide a PFA tube made of a copolymer (PFA) of tetrafluoroethylene (TFE) and perfluoro(alkyl vinyl ether) (PAVE), which is a tube obtained by melt extrusion molding PFA containing 3 to 50 weight % of PAVE in the copolymer and having a melt flow rate (MFR) of 0.1 to 100 g/10 min when measured with a load of 5 kg and a measurement temperature of 372±0.1° C. in accordance with ASTM D1238, and then heat treating at a temperature between 130° C. below the copolymer melting point and the copolymer melting point, where the blister presence rate as calculated by aforementioned equation [I] is 50% or less after blister occurrence testing.

Note that the blister presence rate of the present invention is determined by measuring the number of blisters before and after heat treating by the method of "measuring the number of occurring blisters" described below, and then calculating by using the aforementioned equation [I].

With the present invention, a molded body with a hollow portion having a blister presence ratio of 50% or less can be obtained, but it is also possible to obtain a molded body with a hollow portion that has a blister presence rate of 35% or less. Furthermore, with the present invention, a tube with a blister presence rate of 35% or less, and preferably 5% or less can also be obtained.

EXAMPLES

The present invention is described in further detail by way of Examples and Comparative Examples. However, the present invention is in not intended to be limited to these.

The method of measuring the physical properties and the raw materials that are used in the present invention are described below.

A. Physical Property Measurements (1) Melt Flow Rate (MFR)

The melt flow rate (MFR) is measured in accordance with ASTM D1238, with a load of 5 kg and at a measurement temperature of 372±0.1° C.

(2) Blister Measurements

The number of blisters that occurred was measured for the molded body for measuring blisters that was obtained by the following blister occurrence test.

(a) Blister Occurrence Test

Hydrochloric acid at a concentration of 35 mass % was sealed in the hollow portion of the molded body with a hollow portion. Then, the molded body filled with hydrochloric acid was immersed in pure water in a container, and the container was placed in an oven at 70° C.

This condition was maintained for 2 months, and then the molded body was removed, the hydrochloric acid was released, the hollow interior of the molded body was washed 5 times with pure water, and then air dried for 12 hours at room temperature to obtain a molded body for measuring blisters.

FIG. 4 is a schematic diagram illustrating the condition of the blister occurrence test for a case where the molded body is a tube. In FIG. 4, sealing stoppers 2 were attached at both ends of a heat treated tube where a 50 cm length was cut to a 25 cm length, hydrochloric acid 3 with a concentration of 35 mass % was sealed in the tube, the tube filled with hydrochloric acid was immersed in pure water 5 in a glass bottle 4, and the glass bottle was placed in an oven 6 at 70° C.

Note that for the case of a pipe (for example a tube), sealing stoppers were used as the method for sealing, but it is also possible to perform sealing by thermally fusing the ends of the molded body.

Furthermore, with a molded body that is used after sealing such as a storage container (bottle), a filter housing, a pump, or the like, a sealing stopper can be used in a similar manner to a tube, or a separate lid can be used for sealing the molded body. For a joint for a pipe (fitting), a commercial sealing stopper can also be used in a similar manner to a tube.

(b) Measurement of Number of Occurring Blisters

1) Transcribing the Surface of a Molded Body for Measurement

A PFA plate (shore D hardness D51, thickness 1.5 mm) was used as a base plate, carbon transcription paper (SOL General Carbon paper #1300 pencil use) was placed on the transcription surface, and regular white copy paper (thickness 0.09 mm) was placed thereon.

A molded body for measuring blisters (length 40 mm, width 20 mm) was placed on the copy paper, and the measurement surface of the molded body for measuring was pressed down with a 1 kg weight placed thereon so as to form a compressed pattern on the transcription paper. The number of blisters on the transcription paper 40 mm long and 20 mm wide that was obtained was measured.

If the measurement surface of the molded body is a flat surface, the measurement surface is pressed down by the 1 kg weight. Furthermore, if the measurement surface is a curved surface, a transcription image for the entire measurement surface is obtained by moving the measurement surface while pressing with the 1 kg weight.

FIG. 5 is a schematic diagram illustrating an example of creating the transcription image for the case where the molded body has a tubular shape. In FIG. 5, a tube 10 of width 20 mm and length of 40 mm was pressed by a 1 kg weight 12 while rotating on carbon transcription paper 8 placed on the PFA plate 7 with the transcription surface facing up so as to obtain a transcription image. In this case, a guide part 11 as illustrated in FIG. 5 can be provided in order to achieve a stable transcription.

2) Measurement of the Number of Blisters

The number of spot patterns with a major diameter of 0.1 mm or longer present in the count measuring range of 40 mm long and 20 mm wide of the transcription image obtained was measured. The number measurement was performed by a 20-times enlargement using a microscope (Olympus BX 51).

The number of blisters on the transcription image obtained was measured for three molded bodies for measurement, and the average value was used as the number of blisters.

3) Blister Presence Rate

The blister presence rate was calculated by the following equation [I] based on the number of blisters obtained by the blister number measurement.

Blister presence rate=number of blisters in a heat treated molded body/number of blisters in an equivalent molded body that has not been heat treated [I]

(3) Melting Point (Melting Peak Temperature)

A differential scanning calorimeter (Pyris 1 model DSC produced by Perkin Elmer) was used. Copolymer powder (10 mg) was weighed and placed in a dedicated aluminum pan and crimped using a dedicated crimper. Then, the pan was housed in the DSC main body, and the temperature was increased from 150° C. to 360° C. at a rate of 10° C./min. The copolymer melting peak temperature (Tm) was determined from the melting curve obtained at this time.

(4) Number of Stable End Groups

The number of copolymer unstable end groups was measured in accordance with Japanese Examined Patent Application No. H4-83.

B. Raw Material Copolymers (1) PFA (1)

PFA produced by Mitsui DuPont Fluorochemical Co., Ltd. Tetrafluoroethylene/perfluoroethylvinyl ether copolymer, MFR 2 g/10 min, melting point 320° C., fluorinated treated to less than 6 unstable end groups (—CH$_2$OH end group, —CONH$_2$ end group, —COF end group) per $10^6$ carbon atoms.

(2) PFA (2)

PFA produced by Mitsui DuPont Fluorochemical Co., Ltd. Tetrafluoroethylene/perfluoro propyl vinyl ether copolymer, MFR 2 g/10 min, melting point 320° C., fluorine treated to less than 6 unstable end groups (—CH$_2$OH end group, —CONH$_2$ end group, —COF end group) per $10^6$ carbon atoms.

Example 1

(A) Tube Preparation

An unstretched tube with an outer diameter of 12.7±0.12 mm and a wall thickness of 1.59±0.10 mm was obtained using PFA (1) at 360° C. using a 30 mm diameter extrusion molder.

(B) Heat Treatment

The tube was cut to approximately 50 cm, and then set on a glass cloth in a STPH-101 oven produced by ESPEC maintained at a heat treatment temperature of 300° C., and held at this temperature for 1 hour to perform the heat treatment. Then, the tube was removed and allowed to sit until reaching room temperature. Next, the oven was set to 25° C. while leaving the tube in the oven, and the tube was removed after the temperature was reduced. The heat treated tube that was obtained was subjected to the blister occurrence test.

(C) Blister Occurrence Test

A 25 cm length was cut from the approximately 50 cm of the heat treated tube that was obtained in accordance with the blister occurrence test method for the case of a tube, sealing stoppers 2 (Super 300 produced by Pillar Packing Co., Ltd.) were attached to both ends of the heat treated tube, and then 25 mL of hydrochloric acid with a concentration of 35 mass % HCl was sealed in the tube. The tube filled with the hydrochloric acid was placed vertically in a glass bottle 4, pure water 5 was added so that the entire surface of the tube was immersed, and then the bottle was placed in an oven 6 at 70° C. After leaving it in this condition for 2 months, the tube was removed from the glass bottle 4, the hydrochloric acid with a concentration of 35 mass % was removed from the sealing stopper 2, the inside of the tube was washed with pure water 5 times, and then air dried for 12 hours at room temperature to obtain a blister measurement tube.

(D) Measurement of the Number of Occurring Blisters

Figure 6:
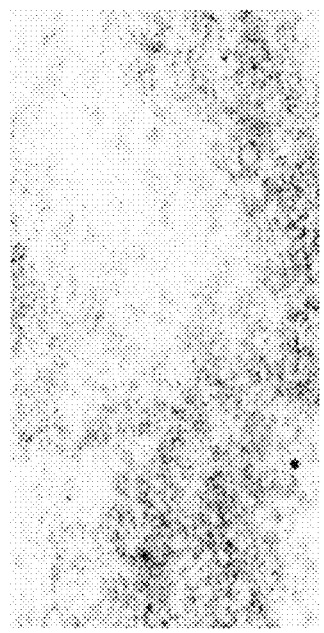
FIG. 6 are transcription image diagrams of the surface of the molded body for measuring blisters obtained by Examples 1 and 2, and Comparative Example 1. In the Figure, (A), (B), and (C) are transcription images for Example 1, Example 2, and Comparative Example 1, respectively.
Figure 6:
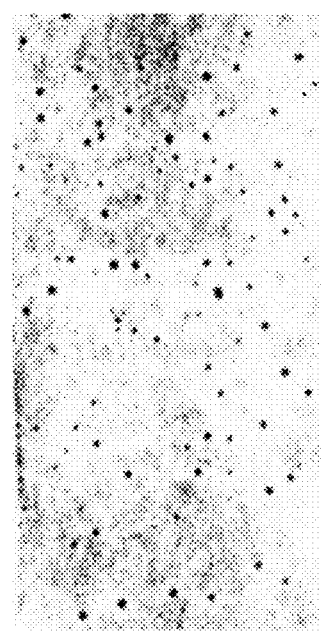
Figure 6:
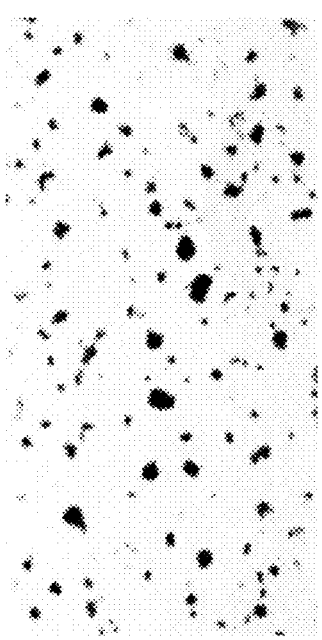

A length of 20 mm was cut from the blister measurement tube that was obtained to obtain a molded body for measuring, a guide part 11 was provided as illustrated in FIG. 5, and then a 1 kg weight was pressed while rotating for a length of 40 mm to obtain a transcription image by transcribing the surface of the molded body for measuring. Reference symbol 13 in FIG. 5 represents a PTFE plate (Shore D hardness: D 51, 80 mm×28 mm×5 mm) provided in order to stabilize the molded body for measuring and the weight. The number of blisters was measured for the transcription image that was obtained. The number of blisters was measured for 3 molded bodies for measuring, and the average value was calculated. The results are shown in Table 1. Furthermore, an example of the transcription image obtained is shown in FIG. 6 (A).

Figure 3:
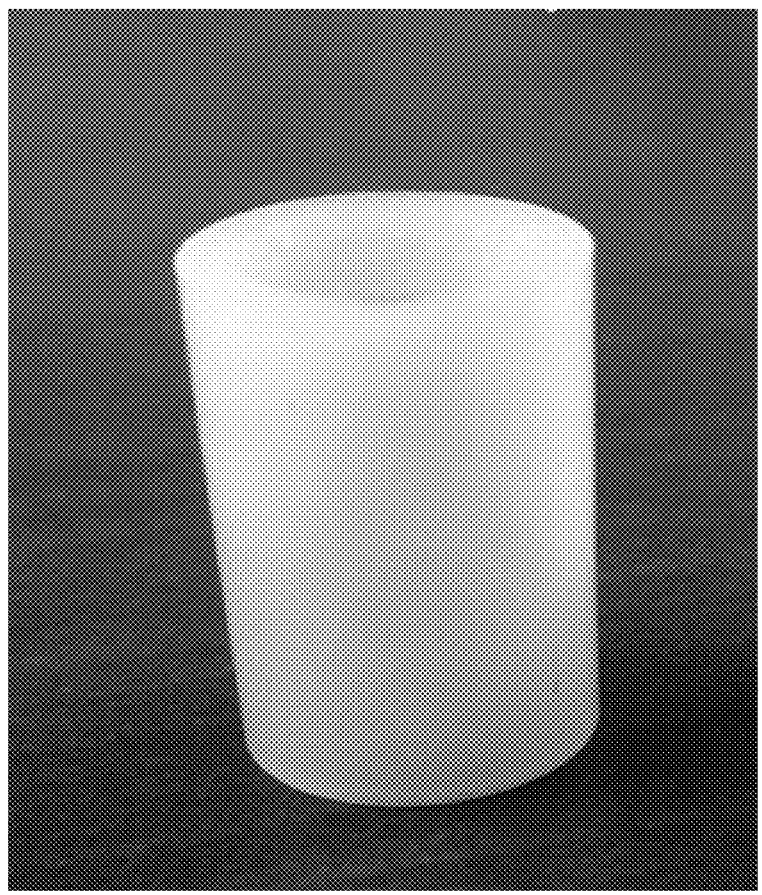
FIG. 3 is the appearance after blister occurrence testing of a PFA tube with excellent blister resistance obtained by the present invention.

FIG. 3 shows the appearance of the heat treated tube after the blister occurrence test. The occurrence of blisters in the heat treated tube was not actually observed, and the outer surface was smooth even after the blister occurrence test.

Example 2

The number of blisters was measured in the same manner as in Example 1, except that the heat treatment temperature for the tube was changed to 260° C. The results are shown in Table 1. An example of the transcription image obtained is shown in FIG. 6 (B).

Comparative Example 1

Figure 2:
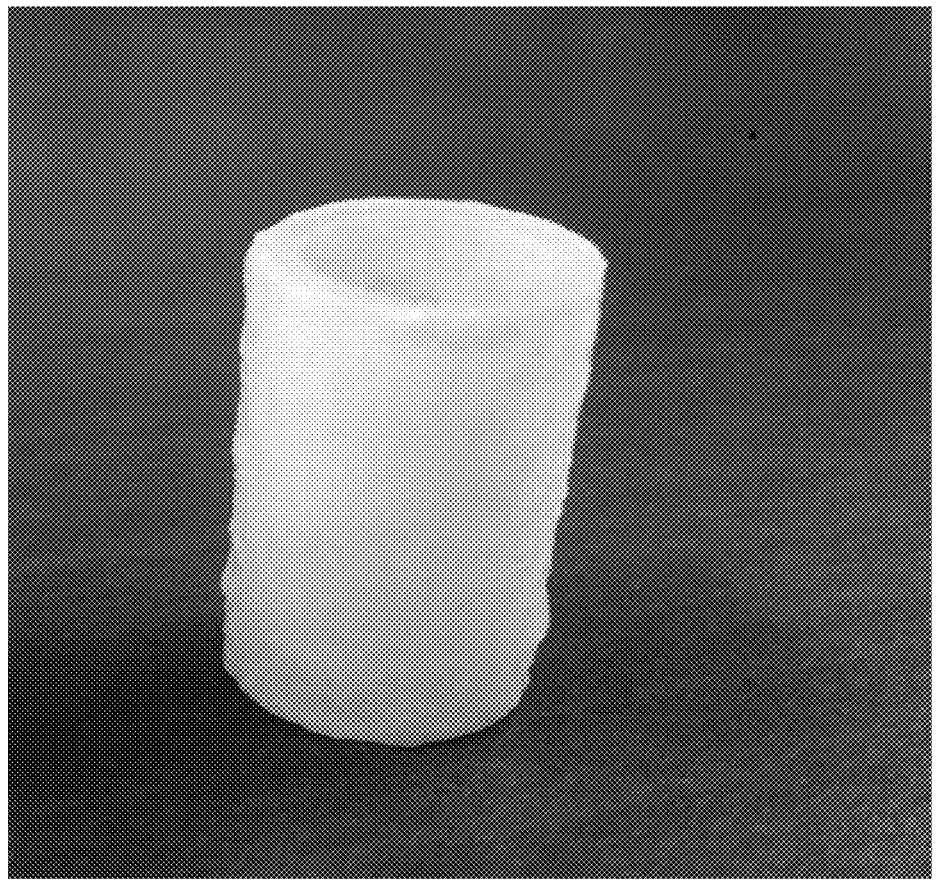
FIG. 2 is the appearance of a comparative example PFA tube where blisters have occurred.

The number of blisters was measured in the same manner as in Example 1, except that heat treatment was omitted. The results are shown in Table 1. An example of the transcription image obtained is shown in FIG. 6 (C). FIG. 2 shows the appearance of the tube after the blister occurrence test. The occurrence of many blisters was observed in the tube, and the outer surface was rough.

TABLE 1

|  | Resin | Heat treatment temperature (° C.) | Number of blisters | Blister presence ratio (%) |
| --- | --- | --- | --- | --- |
| Example 1 | PFA (1) | 300 | 1 | 0 |
| Example 2 | PFA (1) | 260 | 98 | 46 |
| Comparative Example 1 | PFA (1) | — | 214 | –(100) |

Example 3

The number of blisters was measured in a manner similar to Example 1, except that the tube was prepared using PFA (2). The results are shown in Table 2.

Example 4

The number of blisters was measured in the same manner as in Example 3, except that the heat treatment temperature for the tube was changed to 190° C. The results are shown in Table 2.

Comparative Example 2

The number of blisters was measured in the same manner as in Example 3, except that the heat treatment was omitted. The results are shown in Table 2.

TABLE 2

|  | Resin | Heat treatment temperature (° C.) | Number of blisters | Blister presence ratio (%) |
| --- | --- | --- | --- | --- |
| Example 3 | PFA (2) | 300 | 0 | 0 |
| Example 4 | PFA (2) | 190 | 0 | 0 |
| Comparative Example 2 | PFA (2) | — | 189 | –(100) |

INDUSTRIAL APPLICATION

The present invention provides a PFA molded body with a hollow portion that has excellent blister resistance. The present invention provides a method for inhibiting the occurrence of blisters in a PFA molded body with a hollow portion. The occurrence of blisters in the PFA molded body with a hollow portion can be inhibited by the present invention, and thus the useful life of the molded body can be greatly extended.

What is claimed is:

1. A molded body with a hollow portion consisting of fluorinated tetrafluoroethylene and perfluoro(alkyl vinyl ether) copolymer obtained by heat treating a melt-molded body with a hollow portion consisting of fluorinated tetrafluoroethylene and perfluoro(alkyl vinyl ether) copolymer containing 3 to 50 weight % of perfluoro(alkyl vinyl ether) and having a melt flow rate of 0.1 to 100 g/10 min when measured with a load of 5 kg and a measurement temperature of 372±0.1° C. in accordance with ASTM D1238, wherein said heat treating is performed at a temperature of from 130° C. below the melting point of said copolymer to the melting point of said copolymer for a time period of from 0.1 minutes per 1 millimeter to 1500 minutes per 1 millimeter of said molded body for a time period of up to one hour, to result in said molded body having a blister presence rate of 50% or less as calculated by the equation: blister presence rate=number of blisters in a heat treated molded body/number of blisters in an equivalent molded body that has not been heat treated.

2. The molded body according to claim 1, wherein said heat treating is performed at a temperature of from 80° C. below the melting point of said copolymer to the melting point of said copolymer.

3. The molded body according to claim 1, wherein said heat treating is performed at a temperature of from 60° C. below the melting point of said copolymer to the melting point of said copolymer.

4. A molded body according to claim 1, wherein said molded body is tubing or a fitting used in apparatus for the manufacture of semiconductors or liquid crystals, or in a chemical plant.

5. A method of controlling blisters in a molded body with a hollow portion consisting of fluorinated tetrafluoroethylene and perfluoro(alkyl vinyl ether) copolymer, comprising heat treating a melt-molded body consisting of fluorinated tetrafluoroethylene and perfluoro(alkyl vinyl ether) copolymer, wherein said copolymer has a melt flow rate of 0.1 to 100 g/10 min when measured at a load of 5 kg and a measurement temperature of 372±0.1° C. in accordance with ASTM D1238, and wherein said heat treating is performed at a temperature of from 130° C. below the melting point of said copolymer to the melting point of said copolymer for a time period of from 0.1 minutes per 1 millimeter to 1500 minutes per 1 millimeter of said molded body for a time period of up to one hour, whereby said molded body after said heat treating has a blister presence rate of 50% or less as calculated by the equation: blister presence rate=number of blisters in a heat treated molded body/number of blisters in an equivalent molded body that has not been heat treated.

6. The method according to claim 5, wherein said heat treating is performed at a temperature from 80° C. below the melting point of said copolymer to the melting point of said copolymer.

7. The method according to claim 5, wherein said heat treating is carried out at a temperature from 60° C. below the melting point of said copolymer to the melting point of said copolymer.

* * * * *